(No Model.)

D. C. HAMLIN.
SLED.

No. 536,202. Patented Mar. 26, 1895.

WITNESSES
Harry L. Ames.

INVENTOR
Dewitt Clinton Hamlin
By Addison G. DuBois
Attorney

UNITED STATES PATENT OFFICE.

DEWITT CLINTON HAMLIN, OF GREAT BEND, PENNSYLVANIA.

SLED.

SPECIFICATION forming part of Letters Patent No. 536,202, dated March 26, 1895.

Application filed October 26, 1894. Serial No. 527,009. (No model.)

*To all whom it may concern:*

Be it known that I, DEWITT CLINTON HAMLIN, a citizen of the United States, residing at Great Bend, in the county of Susquehanna and State of Pennsylvania, have invented certain new and useful Improvements in Sleds, of which the following is a specification, reference being had therein to the accompanying drawings.

This invention relates to an improvement in that class of sleds, which are constructed so as to be light and simple, and so they will be well adapted for use by small children. Formerly a great disadvantage attended the structure of these devices, since it was found quite impossible to construct them with that degree of strength and durability which was necessary to withstand the rough usage which such devices inevitably receive. Now this defect was due to the impossibility of properly forming the runners; to endow them with the proper degree of strength and was the cause of an expense which was not commensurate with the market value of the sled, and to make the runners at a reduced cost would result in their being so weak that they had but little commercial value.

It is therefore the main and primary object of this invention, to provide a sled that will have strength enough to make it practically indestructible, and at the same time of such a construction that it may be made cheap enough to enable it to be placed upon the market at a very much reduced cost.

A second object and one relating to the structure of the sled, is to form the runners so as to prevent the sled from sliding laterally a tendency that sleds of this class have, owing to the difficulty to make the runners capable of firmly engaging the ground without retarding the progressive movement of the sled.

With these main objects in view, the invention consists in certain features of construction attending the runners and their association with the body of the sled whereby the several ends defined above are attained. These features of construction will be fully described hereinafter and finally embodied in the claim.

Figure 1:
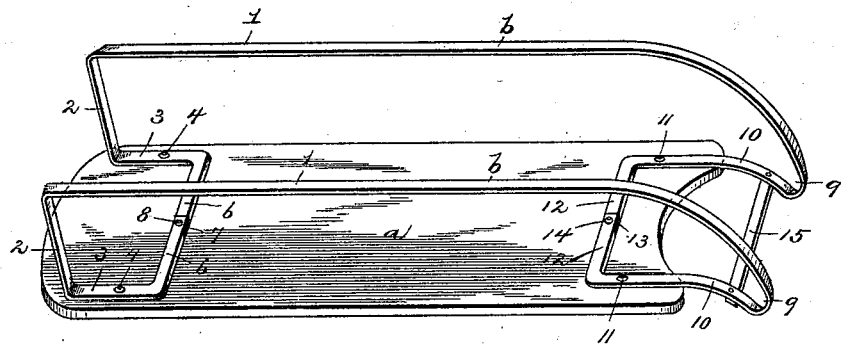
Figure 2:
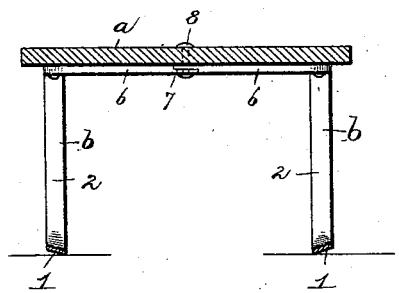
Figure 3:
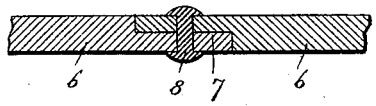

Refering to the accompanying drawings, Figure 1, represents a perspective view of a sled constructed after the manner of my sled or invention, the sled being shown turned upside down, to more fully disclose the runners; Fig. 2, a cross section taken through the sled at a point between its ends, and showing in particular the formation and arrangement of the runners, whereby the lateral sliding of the sled is prevented; Fig. 3, a detail section taken through a portion of the runners and showing the peculiar construction thereof.

In carrying out my invention, I provide the usual body or board *a*, which may be of any form desired, but which is best embodied in the form here shown. The runners are two in number, arranged, as usual, one at each under side of the body or board *a*, and parallel with each other.

*b*, indicates the runners; and each is a duplicate of the other in construction. Each runner is formed of high grade Bessemer steel shaped as a parallelogram in cross-section and formed with the straight portion 1, which bears on the ground and is that part which moves in contact therewith. Rearward of the straight portion 1, each runner is bent upwardly and forwardly to form the standard like portions 2, which have their upper extremities bent horizontally and forwardly to form the bearing portions 3, which lie snugly against the under side of the body or board *a*, and are secured thereto by bolts 4, one for each portion 3, and passing through them and through the body or board *a*. The front ends of the bearing portions 3, are bent inwardly and horizontally, to form the rear connecting terminals 6, all of which are transversely aligned and extended inwardly until their ends are directly adjacent to, or touching each other. Here said ends are formed with the mortise-recesses or indentations 7, which are oppositely disposed on each end and which when joined have the effect of retaining the shape of the metal composing the runners and preventing an enlarged and unsightly joint.

8, indicates a rivet, which is passed through the two reduced ends of the rear connecting terminals 6, and which operates to rigidly join the same.

It will be observed that but one bolt 4, is used to secure the rear end of each runner. Ordinarily this would be obviously too few, and would not be attended by the necessary strength but in my invention this is compensated for by the joining of the terminals 6, by which each runner is braced against the other and the aggregate strength of both runners applied to the use of each. All of this will be more clearly explained as this specification proceeds.

The front end of each runner is curved upwardly and forwardly to form the points or noses 9, whereat they are bent downwardly and rearwardly to form the front bearing portions 10, which lie snugly against the under front side of the body or board $a$, and which are rigidly secured thereto at their rear portions by means of the bolts 11, passing through them and through the body or board 1. Each rear end of the bearing portions 10, is bent inwardly and horizontally to form the front connecting terminals 12, the ends of which are extended to each other and formed with the mortise-recesses or depressions 13, similar in form and function to the depressions or recesses 7, of the rear connecting terminals 6.

14, indicates a rivet, which is passed through the reduced ends of the terminals 12, and which operate to rigidly join the same, after the manner of the joint effected by the rivet 8.

It will be observed, that the construction of the front ends of the runners is substantially the same as the rear end, differing only in the bends 9, which are necessary to form the rise or slant essential to the front (face) of all sled runners. This being the case, it follows that the use of the bolts 11, and rivet 14, is attended by results the same as those which attend the rear ends of the runners, namely: Each of the two runners is strengthened by the aggregate strength of each other, as before explained. In this principle of operation lies the main feature of my invention, and its essentialities consist in forming each runner with a bearing portion at each end, terminating in the terminal portions, which are rigidly joined to each other. This construction, and this alone, produces the result described hereinbefore.

15, indicates a brace rod which is rigidly secured to each runner at a point adjacent to the forward bearing portions and just rearward of the bends 9. This rod is used to make it impossible for the front ends or noses of the runners to spread or contract, which they would perhaps, be likely to do otherwise. It is not however an essential portion of the invention.

By reference to Fig. 2, it will be seen that the runners are shaped as a parallelogram in cross sections, and that the straight portions 1, thereof are disposed out of torsional alignment, so that the inner edges or corners of the runners will engage the ground to the exclusion of the remaining portions. In this construction lies a second, though subordinate, feature of the invention, for it is by these means that the runners are made capable of moving forwardly with greater ease and made incapable of side or lateral movement, all of which has been explained.

Having thus described my invention, what I claim as new, and desire to secure by Letters Patent of the United States, is—

A sled having runners shaped as a parallelogram in cross section and formed with straight portions, 1, capable of bearing on the ground, said straight portions being arranged out of torsional alignment with the remainder of the runner, so that one corner of each straight portion will engage the ground to the exclusion of the remainder of the runner, substantially as and for the purpose set forth.

In testimony whereof I have affixed my signature in presence of two witnesses.

DEWITT CLINTON HAMLIN.

Witnesses:
CHAS. L. CROOK,
F. H. JOHNSTON.